Aug. 6, 1968  F. TEMPLE  3,395,729
CHECK VALVE
Filed Sept. 16, 1965
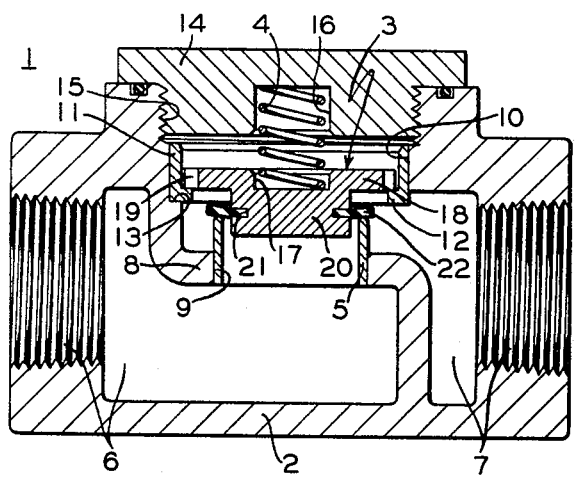
INVENTOR.
Fred Temple
BY
*A. A. Steinmiller*
Attorney

3,395,729
CHECK VALVE
Fred Temple, Pittsburgh, Pa., assignor to Westinghouse Air Brake Company, Wilmerding, Pa., a corporation of Pennsylvania
Filed Sept. 16, 1965, Ser. No. 487,687
2 Claims. (Cl. 137—543.19)

This invention relates to check valves and more particularly to large capacity check valves of the type suitable for operation under high fluid pressures.

Heretofore known check valve devices subject to high fluid pressures have utilized metal to metal contact between the valve and valve seat to seal against fluid pressure leakage. However, such valves are highly susceptible to damage and leakage partially as a result of dirt particles being lodged between the valve and valve seat surfaces such that numerous machining operations may be necessary for providing and maintaining an effective seal therebetween, such operations being quite expensive and resulting in relatively high initial and high maintenance costs. Furthermore, where valve discs of leather, rubber, composition or other resilient materials are used in combination with metal seats, the fluid pressure load on the valve disc is often sufficient to cause the check valve seat to cut the relatively soft valve disc element, thereby destroying its sealing qualities and shortening its service life. Where check valve devices employ the more recent O ring type seals in the valve seat or valve disc, there is the distinct possibility of the O ring seal becoming distorted or even being extruded when subject to relatively high fluid pressures.

Accordingly, it is an object of this invention to provide a simply constructed check valve device suitable for large capacity, high fluid pressure operation, which is of low-cast manufacture, economical to maintain, and the valve member of which is less subject to damage, and has relatively long, maintenance free service life.

Other objects and advantages of the invention will become apparent from the following description of the invention.

According to the present invention, a check valve device is provided comprising a spring-biased disc valve member having a central cylindrical boss which telescopes with a small clearance, coaxially within a cylindrical sleeve, the upper end of which forms an annular valve seat, a resilient annular sealing element being secured in the cylindrical boss and engaging the annular valve seat. The disc valve member is larger in diameter than the depending boss thereon, and the outer periphery thereof, which is fluted or grooved, is adapted to engage a supporting annular shoulder in the valve body or casing after the annular sealing element contacts the valve seat. Accordingly, the reversely acting fluid pressure is effective to seat the disc valve member with seating of the sealing element being effected by and limited to the relatively light force exerted by the reverse acting fluid pressure acting over the narrow annular effective area represented by the difference between the cross-sectional area of the cylindrical boss on the disc valve body and the inner seated area of the annular valve seat.

For a better understanding of the invention, reference may be had to the following more detailed description and to the accompanying single figure drawing which is an elevational cross-sectional view of an illustrative embodiment thereof.

Referring to the drawing, a check valve device 1 suitable for high capacity, high fluid pressure operation is shown comprising a tubular valve body 2 in which a disc valve member 3 is urged with relatively light force under the influence of a spring 4, toward sealing engagement with an annular valve seat formed at the end of a cylindrical sleeve 5 whereby flow of fluid under pressure is effectively controlled.

The valve body 2 is constructed with a coaxial inlet port and passage 6 and an outlet port and passage 7 which are separated from each other by a partition 8 formed integral with the tubular valve body 2. A circular aperture 9 is provided in the partition 8 substantially normal to the common axis of the inlet port and passage 6 and the outlet port and passage 7, the valve seat sleeve 5 being press fitted into aperture 9. Formed in the valve body 2 is a radial bore 10 in which is pressed a bushing 11 having an inturned flange forming a shoulder 12 at its lower extremity that rests on a ledge 13 formed at the base of the bore 10.

A screw-threaded plug 14 is provided for engagement with the outer threaded portion of bore 10 and is appropriately sealed against fluid pressure leakage by an O-ring inset in an annular groove in the outer face of the valve body 2. When plug 14 is removed, access may be had to the various elements of the check valve device 1 for purposes of assembly, disassembly, inspection or repair. The spring 4 has one end thereof supported in a recess 16 on the inner face of the plug 14 and the other end supported in a coaxially related recess 17 in the disc valve member 3.

The disc valve member 3 has a radial annular flange portion 18 with a plurality of grooves 19 in the periphery thereof. Flange portion 18 seats on the upper surface of the inturned shoulder 12 so as to limit movement of the disc valve member 3 in the direction of the valve seat on sleeve 5. Grooves 19 provide passage for fluid under pressure in the outlet port and passage 7 to the upper face of the disc valve member 3 to effect positive seating of said valve member on the inturned shoulder 12. A central cylindrical boss portion 20 of the disc valve member 3 has an annular recess 21 encircling its periphery in which an annular, resilient, washer-like valve element 22 is retained. The outer periphery of the washer-like valve element 22 extends radially beyond the outer annular periphery of the valve seat on sleeve 5 to insure engagement thereof in its seated position. The outer diameter of the boss portion 20 preferably has a small clearance with respect to the inner diameter of sleeve 5, for purposes of limiting the area of the resilient valve element 22 subject to reverse fluid pressure forces, as hereinbefore more fully explained.

Upon downward movement of the disc valve member 3, the valve element 22 carried thereby engages the valve seat on sleeve 5 prior to seating of the flange 18 of disc valve member 3 on the shoulder 12 of stop member 11. Thus, the resilient valve element 22 is somewhat flexed or canted on the valve seat of sleeve 5 in sealing relation therewith.

In operation with the proposed check valve device 1 interposed in a fluid pressure conduit (not shown) void of fluid under pressure, the disc valve member 3 is urged into engagement with stop shoulder 12 of bushing 11 due to the light force, exerted by spring 4, whereby the resilient valve element 22 is slightly flexed on the valve seat of sleeve 5 in sealing relation therewith. Upon pressurization of the inlet port and passage 6 to a certain degree above that of the outlet port and passage 7 as determined by spring 4, the build-up of fluid under pressure acting on the bottom faces of disc valve member 3 and valve element 22 is sufficient to lift the disc valve member 3 from the supporting shoulder 12 of bushing 11 against the light force exerted by spring 4, at which time the resilient valve element 24 is thereby lifted off its valve seat on sleeve 5 to provide an unrestricted passage through which fluid under pressure may flow to the outlet port and passage 7.

As the fluid under pressure in the outlet port and passage 7 approaches equalization with the fluid under pressure in the inlet port and passage 6, and the forces effective on opposite faces of the disc valve member 3 and valve element 22 are substantially balanced, the force exerted by spring 4 is again effective to move the disc valve member 3 and valve element 22 downward toward their respective seats whereby the resilient valve element 22 engages its valve seat on sleeve 5 just prior to seating of the disc valve member 3 on shoulder 12. Thus, the resilient valve element 22 is somewhat flexed or canted on its valve seat on sleeve 5 to insure sealing engagement therewith.

When fluid under pressure in the inlet port and passage 6 is depleted or reduced below that of the outlet port and passage 7, the then higher fluid pressure load in the outlet port and passage 7, effective on the upper faces of disc valve member 3 and valve element 22, is borne by the disc valve member 3, supported on the inturned stop shoulder 12 of bushing 11, independently of the resilient valve element 22, and the reverse acting fluid under pressure from the outlet port and passage 7 is effectively checked or blocked by seating of the valve element 22 on its seat on sleeve 5. The fluid pressure load on the resilient valve element 22 for maintaining a fluid pressure tight seal between the inlet port and passage 6 and the outlet port and passage 7 is then established over a differential effective area of the valve element 22 equal to the relatively small area between the periphery of the central cylindrical boss portion 20 of the disc valve member 3 33 and the annular valve seat on the end of sleeve 5 such that only a relatively light force is effective on the resilient valve element 22 to maintain seating thereof regardless of the degree of preponderance of fluid pressure in the outlet port and passage 7.

Such light fluid pressure loading of the valve element 22 provides for less wear or cutting thereof and avoids the disadvantages associated with apparatus where the sealing element is seated on its valve seat by high fluid pressure or where such high fluid pressure tends to distort or even extrude the sealing element.

Having now described the invention, what I claim as new and desire to secure by Letters Patent, is:

1. A check valve device comprising:
 (a) a valve body having an inlet port and an outlet port with a partition having a flow passage therethrough connecting the inlet and outlet ports, said valve body further having an opening through the wall thereof substantially coaxial with the passage through said partition and in communication with said outlet port,
 (b) a closure element removably securable to said valve body to sealingly close said opening,
 (c) a check valve controlling flow of fluid under pressure through said passage, said check valve being installed through said opening and comprising:
  (i) a member formed with a central cylindrical portion having a flange at one end extending radially ouwtard therefrom, said flange being provided with a plurality of grooves to convey fluid under pressure from the outlet port to the upper face of said member,
  (ii) a flat annular resilient valve element carried on said cylindrical portion in spaced-apart relation to said flange portion of said member,
 (d) annular sleeve means secured in said passage in said partition and having an annular valve seat at the upper end thereof on which said resilient valve element seats, said cylindrical portion of said member extending into said annular sleeve means and conforming closely in diameter to the internal diameter of said sleeve means so as to limit to a low area the effective area of said valve element over which reverse acting fluid under pressure in the outlet port is effective to maintain seating thereof,
 (e) means disposed between said closure element and said member to bias said member in a direction to seat the resilient valve element on said valve seat, and
 (f) stop means carried by said valve body and engageable by said flange of said member following seating of said resilient valve element on said valve seat such that movement of said member toward said valve seat and flexing of said valve element by engagement with said seat is limited.

2. A check valve device comprising:
 (a) a valve body having coaxial inlet and outlet ports with a partition therebetween, said partition having a flow passage therethrough connecting the inlet and outlet ports, said valve body further having an opening through the wall thereof substantially normal to the axis of said inlet and outlet ports and coaxial with said passage while being in constant communication with said outlet port,
 (b) a closure element removably securable to said valve body to sealingly close said opening,
 (c) a check valve controlling flow of fluid under pressure through said passage, said check valve comprising:
  (i) a disc element formed with a central cylindrical portion having an annular recess encircling the periphery thereof and an annular flange extending radially outward from the upper end thereof, said flange being provided with a plurality of grooves to convey fluid under pressure from the outlet port to the upper face of said disc element,
  (ii) a flat annular resilient valve element disposed in said recess and extending radially outward therefrom in axially spaced relation to said flange of said disc element,
 (d) annular sleeve means secured in said passage in said partition and having an annular lip portion at the upper end thereof constituting a valve seat on which said resilient annular valve element seats, said cylindrical portion of said disc element extending telescopically into said flow passage within said sleeve means and conforming closely in diameter to the internal diameter of said sleeve means so as to limit to a low area the effective area of said valve element over which reverse acting fluid under pressure in the outlet port is effective to maintain seating thereof,
 (e) means disposed between said closure element and said disc element to bias said disc element in a direction to seat the resilient valve element on said valve seat, and
 (f) an annular stop member secured in said opening in said valve body and formed with an inturned flange engageable by the flange in said disc element to support said check valve following seating of the resilient valve element in the valve seat in said annular sleeve means.

References Cited
UNITED STATES PATENTS

| | | | |
|---|---|---|---|
| 1,509,508 | 9/1924 | Grunwald et al. | 137—543 X |
| 874,652 | 12/1907 | Bailey | 251—357 X |
| 2,588,157 | 3/1952 | Olson | 137—516.29 |
| 2,621,011 | 12/1952 | Smith | 251—359 X |

FOREIGN PATENTS

| | | |
|---|---|---|
| 197,152 | 5/1923 | Britain. |
| 535,918 | 1/1957 | Canada. |
| 591,449 | 4/1925 | France. |

WILLIAM F. O'DEA, *Primary Examiner.*

D. LAMBERT, *Assistant Examiner.*